July 27, 1965 R. YII 3,197,623

DECIMAL ADDER-ACCUMULATOR

Filed Sept. 15, 1961 4 Sheets-Sheet 1

Fig. I

INVENTOR.
ROLAND YII

BY Kenneth L. Miller

ATTORNEY

INVENTOR.
ROLAND YII
BY Kenneth L. Miller
ATTORNEY

INVENTOR.
ROLAND YII
BY Kenneth L. Miller
ATTORNEY

July 27, 1965 R. YII 3,197,623

DECIMAL ADDER-ACCUMULATOR

Filed Sept. 15, 1961 4 Sheets-Sheet 4

INVENTOR.
ROLAND YII
BY Kenneth L. Miller
ATTORNEY

3,197,623
DECIMAL ADDER-ACCUMULATOR

Roland Yii, West Chester, Pa., assignor to Burroughs Corporation, Detroit, Mich., a corporation of Michigan Filed Sept. 15, 1961, Ser. No. 138,451
13 Claims. (Cl. 235—173)

This invention relates to adders, and more particularly to a novel transfer circuit for coupling carry signals between successive stages of an adder-accumulator.

There are various types of adders in which information is counted in a particular radix, described herein by way of example as a decimal or scale of ten radix, and including a plurality of stages for accumulataing the input counts. Conventional accumulators of this sort suffer by virtue of requiring a substantial delay for storing carry signals which occur during the overflow of any particular stage. It has heretofore been considered necessary to allot a substantial time period for storing carry signals and later transferring them to the next successive count stage so as to be non-interfering with the input count information. Parallel adder arrangements having input signals furnished simultaneously to each of the various stages of the accumulator provide a rapid means for entering multi-digit count information and for adding additional count information in parallel into the accumulator. Heretofore, however, it has been considered necessary in magnetic core embodiments to furnish additional cores for storing carry signals and to utilize a multiple phased clock source to accommodate the carry signals in a non-interfering fashion.

The present invention solves the problems encountered in these prior art adder-accumulators by providing an extremely rapid carry circuit for transferring carry signals practically instantaneously following the termination of the input pulses added to each counter stage. To expeditiously and with a minimum number of components provide a rapid and accurate multistage adder, the present invention incorporates a multicount core configuration described in application Serial No. 498,257, of T. C. Chen and R. A. Tracy, filed March 31, 1955, titled "Magnetic Device," now abandoned in favor of continuation application Serial No. 221,399, filed August 28, 1962, and assigned to the same assignee as this application. The step counter arrangement of said Chen and Tracy application comprises two magnetic cores, each having substantially rectangular hysteresis loops with a first core providing quantized volt-second integral pulses as inputs to a second or count core operating as a multistable state core whose number of stable states is selected in accordance with the particular radix count desired. The count core provides a single output after a predetermined number of quantized input pulses step the count core to its plurality of stable states into a saturation state.

The present invention utilizes a capacitor to store carry signals between respective stages of the step counter and for transferring the carry signals upon termination of input pulses. In a multistage adder-accumulator, using the base ten as an example, input pulses may be entered in parallel to each of the stages of a counter utilizing the capacitor between stages as an energy carry storage. If the accumulator starts from a cleared condition, then a carry will occur from each stage as the tenth input pulse appears causing the step counter to be reset as well as providing the carry signal for subsequent transfer to the next successive stage. In the instant invention, the carry signals are coupled between stages by virtue of semiconductor devices operating as amplifiers to control and maintain the carry signal stored in a capacitor until after the termination of the input pulses. They also serve as gating devices for reading out and standardizing the transferred energies to furnish the quantizing core of the next successive stage with sharp pulses for stable and rapid operation. A particularly desirable feature of the present invention includes a circuit arrangement for a "direct read through" of a carry signal to a number of successive stages which may each contain a nine count without the necessity of having the signal delayed by storage in the interstage capacitors. Furthermore, when carry signals do occur from a number of stages for storage in the subsequent interstage capacitor, circuit means are provided for simultaneous transfer of such carry signals to the respective succeeding stages. The instant invention may be readily designed to operate at a 50 kc. repetition rate and when a consecutive carry signal propagates through a number of stages, it is found that this action appears with merely a fraction of a microsecond inherent delay in each of the cascaded stages.

Accordingly, one of the objects of this invention is to provide a fast and stable carry signal between successive stages of an added circuit which may by way of example utilize magnetic step counters.

Another object of this invention is to provide a parallel read-in for an adder circuit utilizing magnetic step counters in which a novel temporary storage is prov'ded for a carry signal between successive stages of the adder circuit.

A still further object of this invention is to provide a capacitor carry storage between successive stages of an adder circuit in which the carry signals may be simultaneously transferred to the next following stages at a selected instant of time.

Yet another object of this invention is to incorporate as an interstage carry coupling circuit between successive stages of a magnetic adder a semiconductor transfer arrangement with a capacitor storage to either maintain a charge stored in a capacitor until a carry may be completed, or by-pass the carry capacitor for an almost instantaneous stage-to-stage transfer when the stages are set for a consecutive carry or "direct read through" condition. The "direct read through" condition may be expressed as follows: Assuming there are nines stored in several consecutive stages, one carry propagates through these stages without storing its effective energy in interstage carry capacitors. This phenomena is one of the special characteristics of this carry circuit and permits direct read through with an insignificant delay of a fraction of a microsecond per stage.

Another object of this invention is to provide a magnetic core adder circuit in which an augend may be set in parallel to the various stages of a magnetic core adder followed by an addend set into the stages of such adder circuit allowing for a simultaneous carry from the overflow stages of the adder.

The sum of the adder-accumulator may be subsequently counted out by providing a burst of ten readout pulses simultaneously to each of the stages and determining the time during which the stages provide an output pulse. Of course, during this operation it is necessary to block the interstage overflow signals, which would normally appear as carry signals, to achieve a proper operation. The circuit of this invention may also find usage as a preset counter by providing an input to the cleared counter to each of the stages in parallel followed by consecutive input pulses to be counted as input to the first stage of the multi-stage counter and a sensing mechanism for determining when the entire counter is filled and when an overflow appears from the last stage.

The novel features which are believed characteristic of the invention are set forth with particularity in the appended claims. The invention itself, however, both as to its organization and method of operation together with further objects and advantages thereof may best be understood by reference to the following description taken in connection with the accompanying drawings in which:

Figure 1:
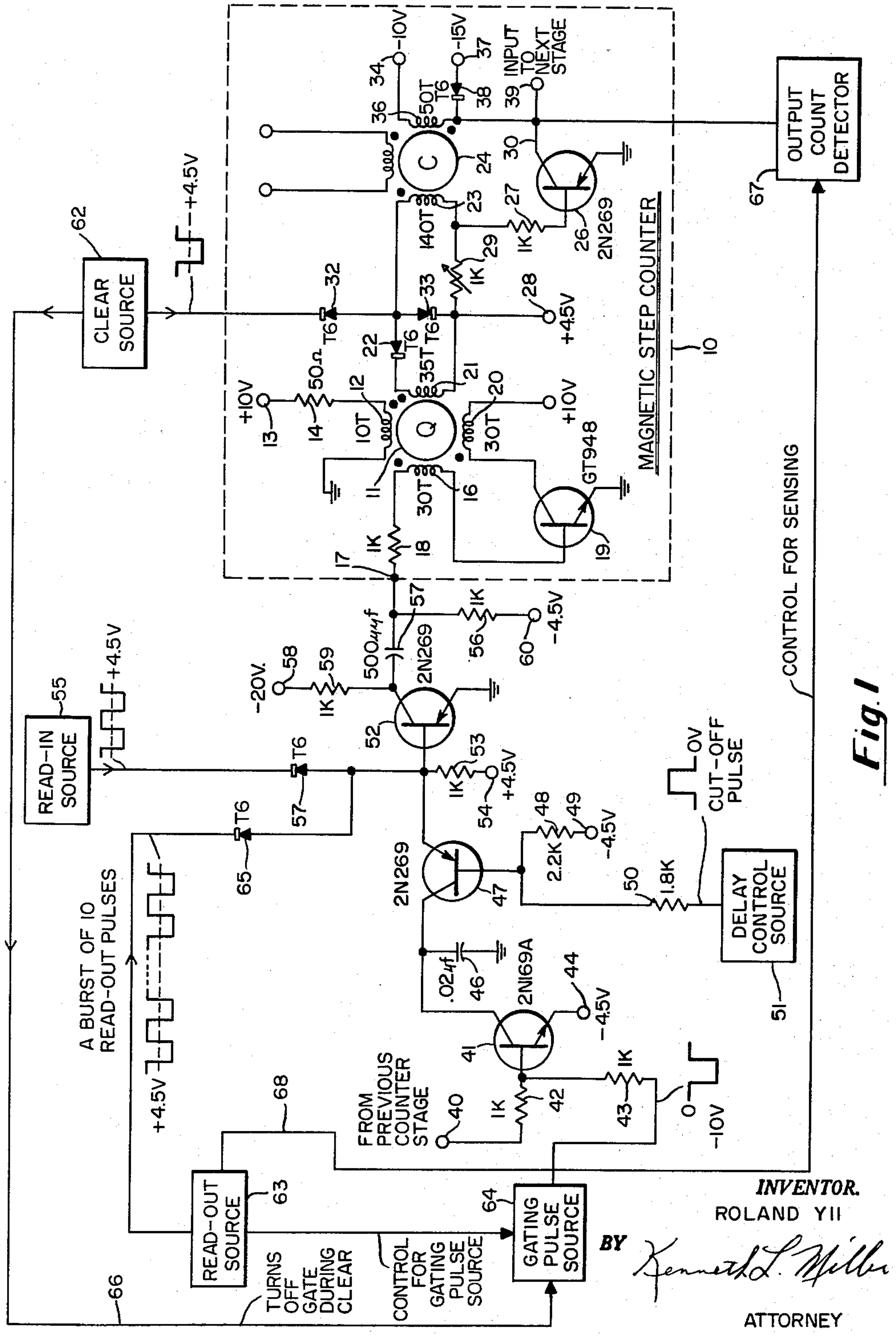
FIG. 1 illustrates a schematic representation of a single stage magnetic step counter including the carry circuitry of a previous counter stage.
Figure 2:
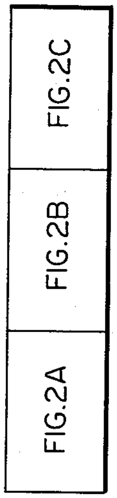
FIG. 2 illustrates the manner of interconnecting FIGS. 2A, 2B and 2C.
Figure 2C:
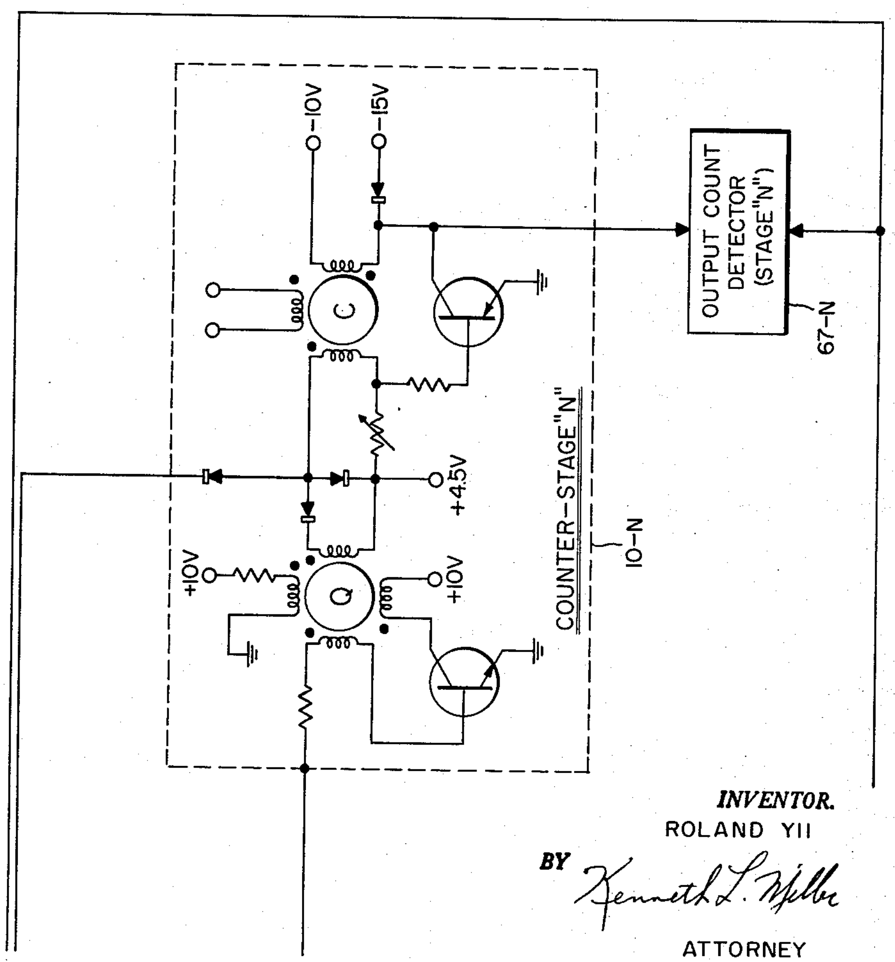
Figure 2A:
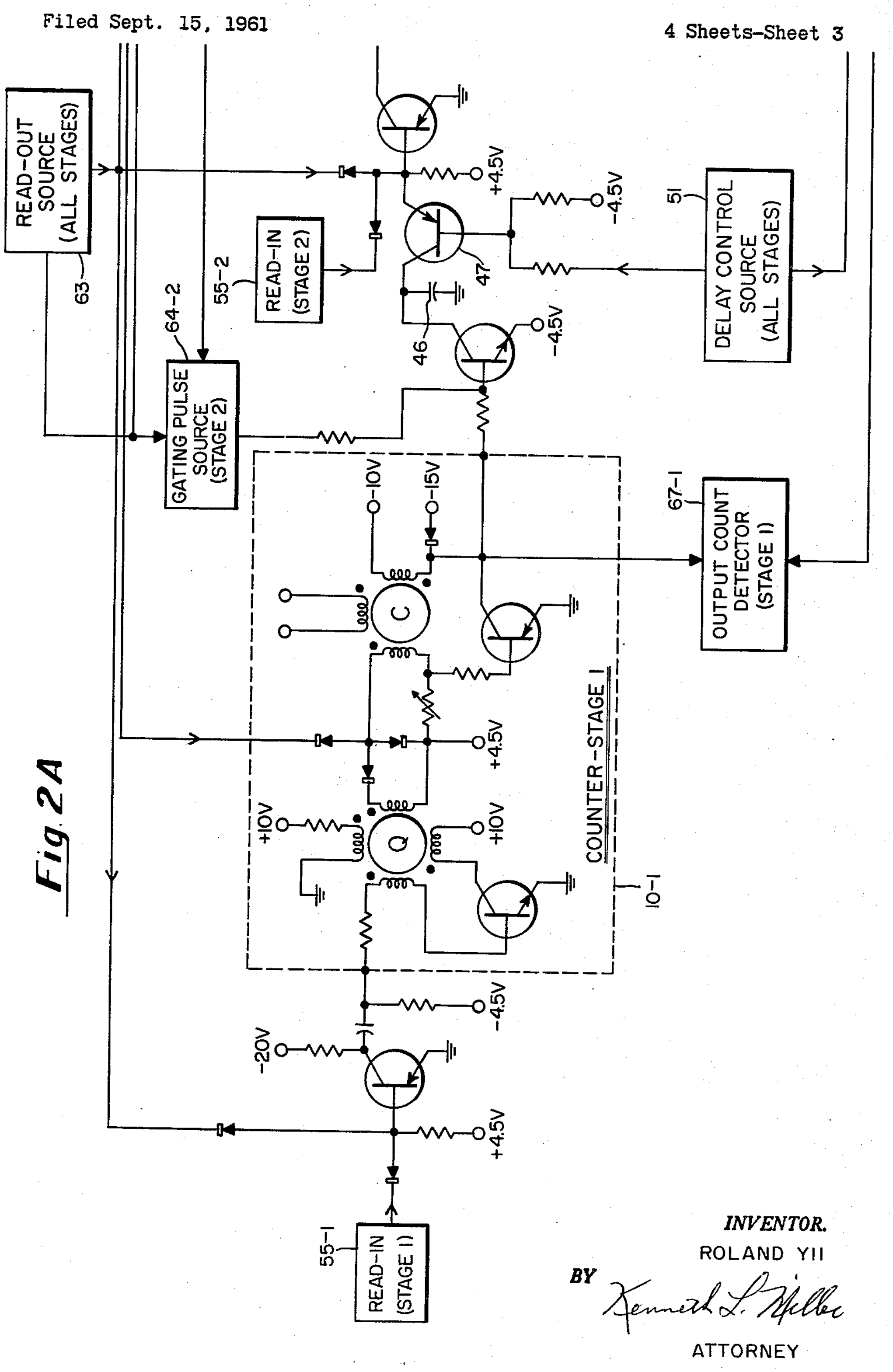
Figure 2B:
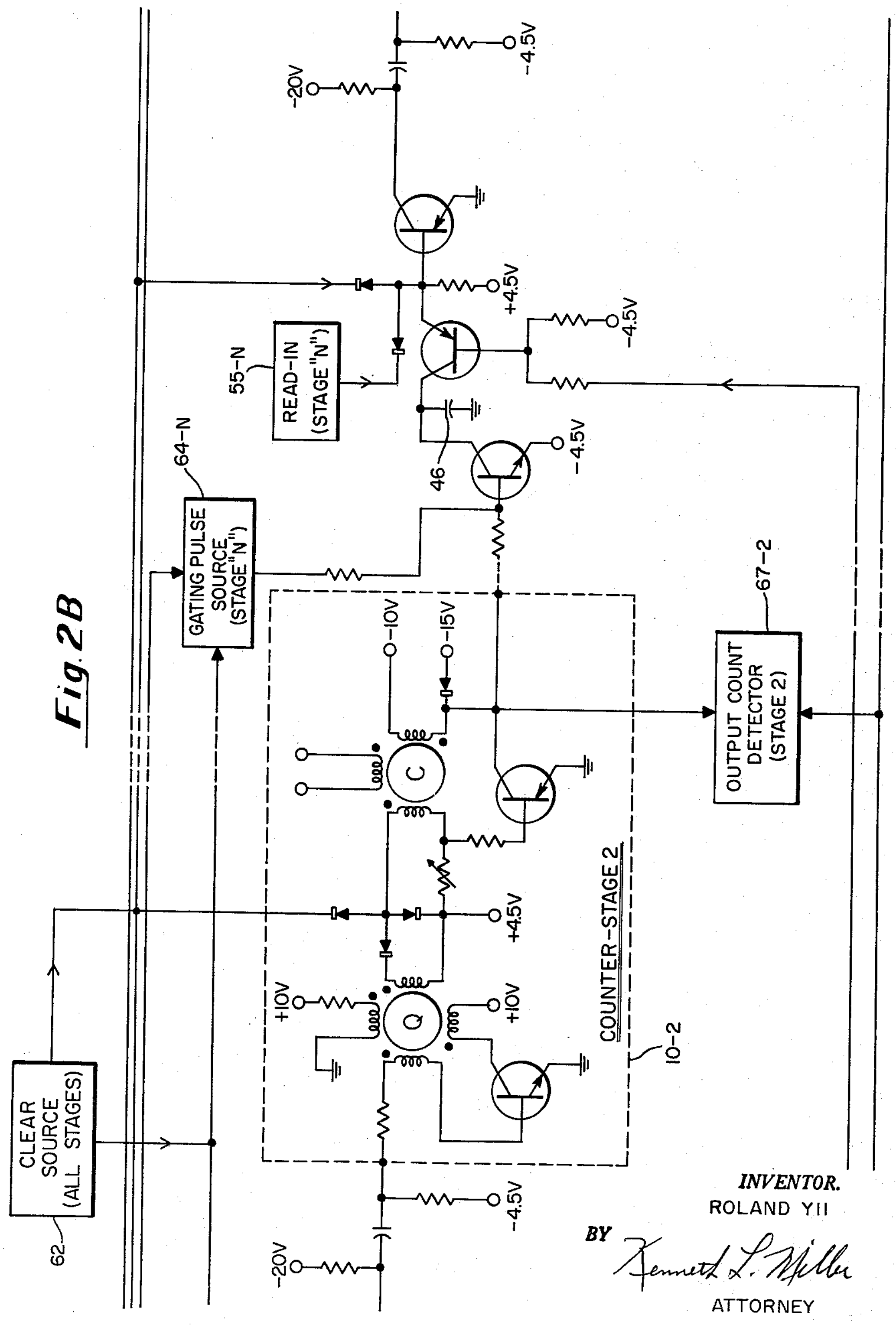

FIGS. 2A, 2B and 2C in composite are a presentation of an "N" stage adder including a plurality of magnetic step counters each associated with a carry circuit of the type illustrated in FIG. 1.

Referring now to FIG. 1, there is illustrated within the block 10 a magnetic step counter of the type disclosed in the aforementioned Chen-Tracy patent application. The quantizing or Q core 11 is normally in its "0" state due to a direct current reset provided through reset winding 12 from a source of positive potential applied to terminal 13 through limiting resistor 14. An input winding 16 has one end connected to an input terminal 17 through a limiting resistor 18 with its other end connected to the base of transistor 19. Transistor 19 operates in a blocking oscillator fashion when provided with an input pulse to reset the core 11 through the winding 20 connected to the collector of transistor 19. An output is generated across winding 21 of core 11 with its upper end connected through diode 22 to an upper end of input winding 23 of count core 24. Any other appropriate quantizing mechanization may be used to provide constant volt-second integral inputs to the count core 24. The input which causes count core 24 to move to the next of its multistable levels causes a transistor 26 to fire after the count core has reached its tenth or saturated condition. The lower end of winding 23 in addition to being coupled to the base of transistor 26 through a limiting resistor 27 is also coupled to a biasing source provided at terminal 28 through an adjustable resistor 29. The value of resistor 29 in addition to the ratio of the number of turns of winding 21 and winding 23 determine the count at which transistor 26 fires to cause the count core 24 to be reset and to provide an output at the collector 30. In an actually constructed embodiment the cores used were permalloy tape wound, ⅛ mil thick, 20 wraps, orange dot marketed by Burroughs Corporation. The coupling circuit between quantizing core 11 and count core 24 also includes a diode 33 connected between the dotted terminal winding 23 and positive potential at 28 to improve the stability of the count circuit. It has also been found that without diode 33 the resetting of the quantizing core due to the D.C. current flowing through winding 12 causes a reverse current to flow through winding 23 and the coupling diode 22 resulting in unreliable counting operation. The reverse current through winding 23 due to the slow recovery time of the diode 22 causes a flux fall-back of the partially switched count core. This additional fall-back causes the number of the count of the step counter to increase before the C core reaches saturation resulting in an improper count believed to be due to temperature effect on diodes. Diode 33 serves as a clamp between the input terminal of the C core and the bias voltage at terminal 28. This diode provides a bypass for the reverse current through diode 22 so that no undesired current flows through the input winding 23 of the count core 24. The collector of transistor 26 is connected to a source of supply at terminal 34 through a collector winding 36. The resetting core also serves to regeneratively couple the collector current to winding 23 to maintain transistor 26 in saturation until the core 24 is completely reset to its "0" state. A source of voltage is connected to terminal 37 through diode 38 to clamp the collector 30 of transistor 26 to a voltage more negative than the collector supply provided at terminal 34 in order to protect the output transistor from break down. Without including a clamp of this nature, transistor 26 can easily be damaged and a direct short may appear between collector and emitter due to back swing of the count core blocking oscillator. An output is provided at collector 30 to terminal 39, which serves as an input to the next step counter stage through an appropriate carry circuit, as will be described hereinafter. It is understood that an output with any reference level may be obtained from a biased additional winding if desired.

In a typical operation of the magnetic step counter included within the outline 10, a single output pulse appears at terminal 39 in response to ten input pulses appearing at input terminal 17. FIG. 1 includes typical values of the components included within a stage of an exemplary circuit, in accordance with the present invention. The number of turns of the respective magnetic core windings are indicated for a decimal operation although it is understood that another radix may be used. In the convention of the present description an arbitrary designation of "0" has been selected as the negative remanent state of the magnetic core due to conventional current flow into a dot terminal. When applying current to a dot terminal, a voltage is induced across the other windings of the core in a direction to cause a current flow out of dot terminals. Assuming that Q core 11 is initially in its "0" or negative remanence condition, a positive input applied to terminal 17 will provide an appropriate base current to NPN transistor 19 to cause that transistor to saturate or "bottom" resulting in collector current flow through winding 20. A regenerated current flow through winding 16 re-enforces saturation of the transistor until the core 11 has completely reversed its state in a single step. A negative voltage has been induced at the upper end of winding 21 enabling current of a proper direction to flow through the coupling circuit including diode 22 providing a quantized input to the input winding 23 of count core 24. Once the core 11 has reached saturation, the blocking oscillator action of the quantizing stage will cease and the direct current reset through winding 12 will cause the core 11 to return to its "0" or negative remanence state. The positive pulse induced at the upper end of winding 21 due to the reset is of an improper direction to forwardly bias diode 22 and no current will be provided to the input winding 23 of the count core. However, as has been mentioned, due to the slow recovery time of diode 22, it is possible for a short period of time to have a reverse flow through diode 22. The stability of a miscount due to this reverse flow, however, is effectively corrected by the inclusion of diode 33 which would be forwardly biased and cause this false signal to be bypassed from the input winding 23. The bias source connected to terminal 28 maintains transistor 26 in a cut off condition during each successive input pulse to quantizing core 11 as the count core 24 is stepped through its respective multistable states until saturation is reached. During such operation the input winding 23 appears as a relatively high impedance compared to the adjustable resistor 29 and insufficient voltage is developed across resistor 29 to overcome the bias from terminal 28. However, when the tenth pulse appears at the input to core 24, the core has reached saturation and the winding 23 appears as a relatively low impedance, causing most of the voltage due to the input signal to be developed across the adjustable resistor 29. This voltage is of a proper magnitude and direction to cause PNP transistor 26 to fire and through regeneration of windings 36 and 23 to operate as a blocking oscillator causing count core 24 to be reset. During the period of conduction of transistor 26, the emitter to collector circuit is essentially a short circuit and the voltage output at the terminal 39 goes from a relatively negative voltage to substantially ground providing an overflow count which may be utilized as an input to the next stage.

In accordance with this invention as shown in FIG. 1, a typical carry output from a preceding stage as an input to the magnetic step counter 10 will now be described. The overflow from the prior count core appears as a positive going pulse rising towards ground and is applied at terminal 40 to the base of NPN transistor 41 through current limiting resistor 42. The emitter of transistor 41 is connected to a negative source of supply applied to terminal 44. The absolute magnitude of this voltage is less than the collector voltage of the preceding count core transistor. The collector of transistor 41 is connected to the upper end of a capacitor 46 whose lower end is grounded and which serves as a temporary storage for a carry pulse. The time interval of storage of the carry pulse in capacitor 46 is controlled by delay PNP transistor 47 whose base is connected through a dropping resistor 48 to a negative source of supply 49 and through a further resistor 50 to delay control source 51, which provides cut off pulses to transistor 47 during the time interval when it is desired that the energy stored in capacitor 46 not be propagated along into the input of the subsequent magnetic step counter. The width of the cut-off pulse must be greater than the sum of the switching time due to read in and the reset time of the Q core of the succeeding stage so that the read in and carry pulses can be distinguished. The emitter of transistor 47 is connected to the base of transistor 52. A bias is also provided at the base of transistor 52 through current limiting resistor 53 from a source connected to terminal 54. Read-in pulses arrive from a read in source 55 through a coupling diode 57. It will be noted that normally transistor 47 has its emitter base junction forwardly biased when the cut off pulse is removed from control source 51 to provide an extremely rapid operation for consecutive carries. It would seem that transistor 52 may not be necessary, but actually it is of considerable value along with a differentiating network including resistor 56 and capacitor 57 to have the step counter operate with a highly reliable count. The collector of transistor 52 receives its supply from a negative potential connected to terminal 58 through resistor 59. The negative supply connected to terminal 60 serves as a cut-off bias for the input transistor 19 of the quantizing stage of the step counter 10. It is extremely important that trigger inputs to the Q core blocking oscillator be fast and narrow on the order of a fraction of a microsecond in width and rise time to operate reliably at the high frequencies mentioned. These inputs with proper shaping are provided along with a sufficient amplitude by the inclusion of transistor 52 and the subsequent differentiating network. In addition to the read-in source 55, the transistor 52 receives a burst of ten pulses of the same nature from a read-out source 63 through diode 65. The read out source 63 also provides a control-signal to a gating pulse source 64 which normally permits transistor 41 to be conducting but which opens this path between the output of a previous stage and the storage element and prevents capacitor 46 from acquiring a charge during the read-out operation. The gate is connected through resistor 43 to the base of transistor 41. A voltage pulse is provided going from ground negatively with an amplitude at least equal to the absolute value of the output pulse of the count core blocking oscillator. A control is also provided to the gating source 64 along line 66 from the clear source 62. An output from the step counter stage in addition to being sent to a next succeeding stage may also be presented as an output to the detector 67. Detector 67 receives a control along line 68 from the read-out source for determining by time comparison the proper output. The information stored in the form of multiple states in the count core can be cleared by a single negative pulse from a clear source 62 to the count core through diode 32 and input winding 23, sufficient to fire the count core blocking oscillator and reset the core from whichever intermediate state in which it previously resides.

In operation of the FIG. 1 carry circuit, an input from the preceding counter stage is applied to the base of transistor 41 and causes conduction through the collector emitter circuit of that transistor in the absence of a negative pulse supplied from gating pulse source 64. During carry operation, transistor 47 is blocked due to a cut off pulse supplied from delay control source 51. Carry storage capacitor 46 is permitted to charge and holds the carry energy until such time as the cut off pulse from the source 51 terminates and permits capacitor 46 to provide conduction through the emitter collector circuit of transistor 47. With sufficient strength the base bias of transistor 52 is overcome and a positive going pulse is provided to the differentiating network 57, 56. The leading edge of this pulse is of a proper polarity to trigger transistor 19 of quantizing core 11, thus resulting in a single count being stepped into the count core 24 in the manner already described. In a normal read in operation of the stage illustrated in FIG. 1, read in pulses from source 55 pass through transistor 52 and differentiating network 57, 56 to similarly provide quantized pulses to the count core 24. In a parallel adder type of circuit, read-out of the adder accumulator can be accomplished by furnishing ten read-out pulses to the respective counter stages and the time interval at which the counter overflows can be utilized to determine the count which had previously been stored. In the embodiment of FIG. 1, read out pulses from source 63 enter the adder through diode 65 and are detected in the output count detector circuit 67 at the instant of time when the count core reaches its saturated state and causes a reset operation. During read-out it is also necessary that a carry signal from a previous counter stage not be allowed to interfere with the count. Therefore, source 63 also controls the gating pulses furnished to the base of transistor 41 and opens this circuit. It is both interesting and important to notice that the information stored in each of the count cores is not altered after ten read-out pulses have been applied to the inputs and the carries suppressed during read-out. Similarly, all stages of the adder can be cleared in any appropriate manner with one such clearing circuit including a source 62 which provides a clearing pulse to all count core blocking oscillators for reset from the intermediate state in which each previously resides. As in the case of read-out, the carry pulse from a previous counter stage must be prevented from being transferred to the subsequent storage capacitor 46 and this control is effected along the line 66 to cause source 64 to turn off transistor 41 during the period of clearing.

FIGS. 2A, 2B and 2C together illustrate a multistage or "N" stage accumulator and can be used as a counter if desired utilizing the basic building block circuitry shown in FIG. 1. The magnetic step counter is illustrated in dashed outline 10 and is the same for the various counter stages 1 through "N." Additionally, the carry circuitry which is common to that already described in connection with FIG. 1 has the corresponding reference numerals. The read-in sources 55–1 to 55–N are respectively associated with the parallel inputs to the units, tens and Nth digit of decimal information. In a parallel read-in operation, counter stage 1 is supplied with a number of pulses corresponding to the units digit, whereas counter stage 2 will receive a number of pulses corresponding to the tens digit, and counter stage N will receive a number of input pulses corresponding to the Nth digit. In a parallel add operation, an additional multidigit number may be added in parallel with a typical example as follows. Assume the number 82 is desired to be entered into the parallel accumulator. Starting from a cleared condition, counter stage 1 will receive two input pulses from read-in source 55–1 resulting in the count core of counter stage 1 being stepped to the second of its multistable state levels. Simultaneously, eight input pulses will be entered from read-in source 55–2 resulting in a count of 8 being stored in the count core of counter stage 2. Next, assume that it is desired to add the number 8 to the value already stored in the adder circuit. Under this condition eight pulses will be applied from the read-in source 55–1, while no pulses are applied from read-in source 55–2. At the time the eighth pulse arrives at the counter core of stage 1, a reset operation takes place and a carry signal is passed on to temporary storage capacitor 46. At the end of an input time period, delay control source 51 permits the delay transistor 47 to conduct, resulting in the transfer of a carry from capacitor 46 through the differentiating network 57, 56 and causing the count core of stage 2 to increase its count from 8 to 9. This gives the proper sum of 90 in the accumulator. Now considering a typical read-out operation, read-out source 63 provides ten pulses in parallel to each of the counter stages. Counter stage 1, which now has a sum of "0," will not receive an overflow pulse until the tenth read-out pulse and the output count detector of stage 1 senses by time comparison the originally stored "0" sum signal. Similarly, the ten read-out pulses applied to counter stage 2 will cause an overflow when the first pulse appears indicating that a 9 was stored in the count core of stage 2. After the count core of this stage overflows, there appears an additional nine pulses from the read-out source 63 which restores the original count to the counter. Thus a read-out operation may be considered to be non-destructive since it reads out the stored information in addition to re-establishing the original count back to the accumulator.

It is understood that the adder-accumulator of FIG. 2 may also be used a counter, if the tens complement of a desired multiple-digit number is read in in parallel after clearing. Counter operation results from entering a continuing number of read-in pulses from source 55–1 until such time as the Nth stage overflows. The time at which the adder overflows is, of course, indicative that the desired input pulse counting has been reached. It may also be appreciated that this adder can be made to subtract by the technique of adding complements. Additionally, a self-checking circuit is arrived at by including two such adders in parallel with one adding direct numbers and the other adding the complements. A comparison circuit indicating that the sum of the corresponding stages is always equal to "0" will check this type of counter performance.

In order to achieve high frequency counting with a minimum of delay time, it is desirable that high frequency transistors be used. In a "direct read through" operation where nines are stored in all successive counter stages, a single input to the first stage may be passed through the entire number of counter stages without the necessity of having these signals temporarily stored in any carry capacitor. This feature enables an extremely desirable high frequency operation. Another patent assigned to the same assignee as this application is Patent No. 2,973,902, issued March 7, 1961, in the names of S. N. Einhorn and J. R. VanAndel. The circuit of that patent, while quite useful, is improved in its speed of operation by incorporating the features of this invention. In that patent each counter stage includes an additional magnetic step counter which serves as a temporary storage for carry signals. It is necessary to actually provide a number of pulses to count out the temporary storage magnetic step counter thereby determining whether or not a carry signal had been previously generated. The type of delay necessitated by the circuit arrangement of that patent is avoided by the rapid carry system described in connection with this present invention. It is understood that various modifications may be made to the invention described herein without departing from the spirit of this invention and the protection intended is limited only by the following claims.

What is claimed is:

1. A magnetic core circuit comprising first and second magnetic core counter stages, the magnetic cores of said stages having a substantially rectangular hysteresis loop, a transfer circuit including coupling means from said first counter stage to a capacitor storage means, means associated with said first counter stage for generating a narrow voltage pulse in said transfer circuit, connecting means from said capacitor storage means to said second counter stage including a delay gating semiconductor device, control means for maintaining said delay gating semiconductor device non-conducting for blocking the input path to said second counter stage for a predetermined time thereby permitting said capacitor to charge under control of said voltage pulse and to subsequently discharge when said gating semiconductor device conducts to permit an input into said second counter stage when said path is unblocked or, alternatively, without delaying said voltage pulse in said capacitor, to unblock said gating semiconductor device to permit an input directly into said second counter stage from said first counter stage over said transfer circuit.

2. A magnetic core transfer circuit comprising first and second multistable state magnetic core counter stages, the magnetic cores of said stages having a substantially rectangular hysteresis loop, means using quantizing cores for stepping said count cores in a plurality of discrete increments to saturation in one direction and providing an overflow signal upon resetting said count cores to an opposite direction, coupling means from said first counter stage to a capacitor storage means, coupling means from said capacitor storage means to said second counter stage including a delay gating semiconductor device, means controlling the conductivity of said semiconductor device for blocking the input path to said second counter stage for a predetermined time period while said first counter stage is being stepped permitting said capacitor means to store the overflow signal generated when said first count core is reset and to thereafter transfer said signal to said second counter stage after said predetermined time period under the control of said conductivity controlling means for said semiconductor device.

3. The transfer circuit of claim 2 wherein said first and second counter stages have means for entering a multi-digit number in parallel with said means controlling said semiconductor device to prevent a first stage overflow signal from interfering with the number being entered into said second counter stage.

4. A transfer circuit for coupling two counter stages of a parallel input decimal adder-accumulator comprising a temporary storage capacitor for storing an overflow signal generated from a first stage during an adding operation, a transistor having an emitter, base and collector electrode, a first counter stage having output connecting means to said storage capacitor, a second counter stage having input connecting means from said storage capacitor through the emitter-collector circuit of said transistor, a delay control source coupled to said transistor base electrode to block said emitter-collector path during a first predetermined time period when said first counter stage is receiving an input count and to enable said capacitor to store any overflow signal from said first stage, said delay control source permitting any such signal stored as an overflow in said capacitor to serve as a current source to transfer a signal through said emitter-collector path after said first predetermined time period as a carry input to said second counter stage.

5. A transfer circuit as defined in claim 4 wherein the input connecting means of said second counter stage includes a further transistor connected to a differentiating network for providing sharp input pulses to said second counter stage.

6. A transfer circuit as defined in claim 5 wherein parallel input pulses for said second counter stage are applied at a point intermediate said transistor and said further transistor, enabling said input pulses to be shaped by said differentiating network.

7. A transfer circuit as defined in claim 4 including a read-out means for entering ten readout pulses to said first counter stage to sense the time at which said first counter stage overflows indicative of its count and further including a gating means between said first and second stages to prevent any read-out overflow from being stored in said temporary storage capacitor.

8. A parallel adder-accumulator circuit having a plurality of stages and including a magnetic core step counter capable of residing in a plurality of stable states for each stage of said adder-accumulator, a temporary storage capacitor connected in integrator fashion in a coupling circuit between the respective stages of said adder-accumulator, parallel read-in means for causing the magnetic core step counter of each said respective adder-accumulator stage to reside in a preselected stable magnetic state, said read-in means providing further input information for, when a predetermined count capacity is exceeded, causing certain of said stages to generate a carry signal for storage in the next adjacent of said capacitors and control means for enabling subsequent discharge of said capacitors thereby automatically permitting a carry transfer to the magnetic core step counter of the next succeeding stage.

9. A parallel adder-accumulator as recited in claim 8 wherein a semiconductor delay control means is provided for each said coupling circuit controlling the discharge of said capacitor to prevent said carry signal from interfering with said parallel input information.

10. A parallel adder-accumulator as recited in claim 8 wherein parallel read-out means is provided along with said read-in means to cycle each magnetic core step counter through its capacity of stable states and means for sensing the time at which each said counter overflows.

11. A parallel adder-accumulator as recited in claim 10 including a gating means between each stage to block the respective carry signals from entering said storage capacitors during a read-out operation.

12. A parallel adder-accumulator as recited in claim 8 wherein clearing means is provided for each counter stage including a gating means between each said stage to block the respective carry signals from entering said storage capacitors during a clearing operation.

13. A parallel adder-accumulator circuit having at least two stages including a magnetic step counter for each stage; each said step counter including an input terminal for receiving count input pulses, a first magnetic core having a set and reset state with means causing said core to become set responsive to each input pulse and means causing said core to become reset intermediate said input pulses, a second magnetic core having a reset and plurality of further stable states, a closed coupling circuit between said first and second magnetic cores including a first asymmetrically conducting device, an input winding on said second core, an output winding on said first core and an impedance means, a normally non-conductive transistor coupled to said second core receiving a bias potential through said impedance means from a bias source connected to said closed loop, said coupling circuit arranged to permit current to flow therein in response to each said first core input pulse causing said second core to step successively to its next stable state creating a potential across said impedance means insufficient in magnitude to overcome said transistor bias but of sufficient magnitude to trigger said transistor into conduction for resetting said second core to provide a carry signal in response to an input pulse when said second core is driven into saturation, in which state said input winding appears as a low impedance to permit a larger voltage across said impedance; a transfer circuit including a temporary storage capacitor between said stages; semiconductor delay control means in said transfer circuit between said capacitor and the first core of a successive stage for controlling said transfer circuit to permit said capacitor to charge and store an overflow signal, said delay control means thereafter permitting said capacitor to discharge after a controllable time period to automatically transfer said signal to the next succeeding stage after said input pulses have terminated.

References Cited by the Examiner

UNITED STATES PATENTS 2,973,902 3/61 Einhorn et al. ---------- 235—173

MALCOLM A. MORRISON, *Primary Examiner.*

DARYL W. COOK, *Examiner.*